A. N. MACNICOL.
APPARATUS FOR DISTRIBUTING MATERIALS.
APPLICATION FILED DEC. 28, 1917.
1,405,731.
Patented Feb. 7, 1922.
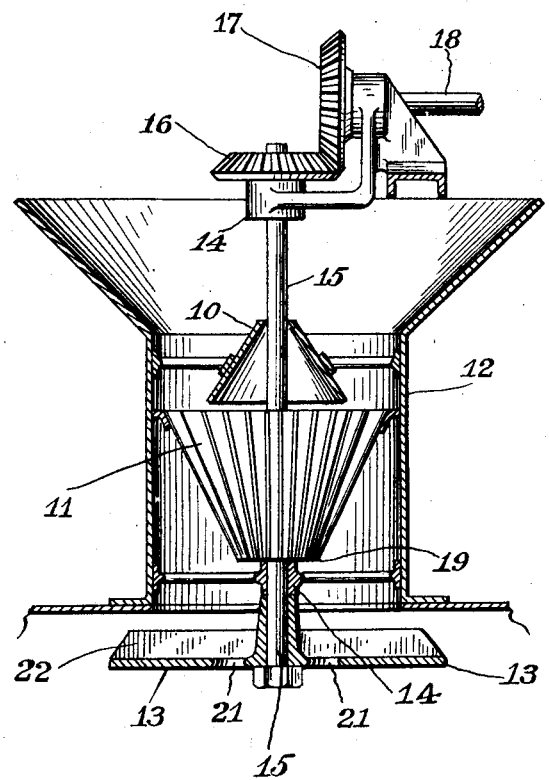
Inventor:
Arnold Nesbitt Macnicol.
Per
Attorney.

UNITED STATES PATENT OFFICE.

ARNOLD NESBITT MACNICOL, OF MELBOURNE, VICTORIA, AUSTRALIA.

APPARATUS FOR DISTRIBUTING MATERIALS.

1,405,731.   Specification of Letters Patent.   Patented Feb. 7, 1922.

Application filed December 28, 1917. Serial No. 209,271.

*To all whom it may concern:*

Be it known that I, ARNOLD NESBITT MACNICOL, a citizen of the Commonwealth of Australia, and resident of Melbourne, in the State of Victoria and said Commonwealth, (whose post-office address is 31 Queen Street, Melbourne, aforesaid,) have invented certain new and useful Apparatus for Distributing Materials, of which the following is a specification.

This invention relates to an apparatus for distributing materials and is specially applicable for use in feeding and distributing coal and ores to ships' bunkers and bins, or for such like.

This invention has been devised in order to overcome the existing defects and to provide improved mechanical means for distributing and feeding coal, ores or other materials at some distance from the point of delivery.

In order that the invention may be more readily understood it will now be described with reference to the accompanying drawing illustrating partly in section one form of distributor constructed in accordance with the invention.

The power required for operating the apparatus may be obtained from any convenient source, but a variable speed motor is preferably used.

In the apparatus shown on the drawing, a rotatable disc 13 is operated by a vertical shaft 15 mounted in suitable bearings 14, 14 and fitted at its upper end with a bevel wheel 16 gearing with a bevel wheel 17 on the power driven shaft 18.

Before delivery to the revolving disc 13 the material is passed over screens for the purpose of separating the material.

The screen 11 shown on the drawing is of conical form, being secured to the hopper 12. The bars of the screen 11 are so proportioned that the openings on the inside are the same width from top to bottom but open out from the inside to the outside so that the material will not jamb or stick in passing through the screen.

The larger lumps of material pass through the bottom or centre opening 19 of the screen 11 and the smaller pieces fall through between the bars of the screen on to the revolving distributor 13 and spread, while central openings 21 are formed in the distributor 13 to allow the larger lumps to fall therethrough. This revolving distributor 13 on its upper surface is provided with radial ribs 22.

Above the screen 11 and centrally of the hopper a cone or other shaped deflector 10 may be arranged for throwing the material on to the bars of the screen 11.

The distributor 13 is provided with at least one opening 21 through which a part of the material may pass directly from the hopper without engaging the distributor. Thus, the void which otherwise would occur beneath the distributor member will be filled by material, and the material will be distributed evenly because of the filling of this void and the centrifugal distribution of the remaining material.

It will be readily understood that when filling irregularly or other shaped compartments, suitable deflectors may be employed as required, and by the centrifugal action of the distributors the material is fed evenly or as required while replenishing bunkers with coal or other compartments or rooms or buildings with various materials.

I claim:

In apparatus for distributing material, a downward conduit for the material, and a rotatable distributing member at the bottom of said conduit, said member comprising a substantially horizontal plate having radial ribs thereon and central openings, and a substantially conical screen extending upwardly and outwardly from the sides of said openings.

Signed at Sydney, New South Wales and said Commonwealth of Australia, this twelfth day of November, 1917.

ARNOLD NESBITT MACNICOL.

Witnesses:
STEPHEN AHERN,
WM. NEWTON.